June 25, 1935. E. G. LEVKOFF Re. 19,625

COLLAPSIBLE EGG CARTON

Original Filed Sept. 22, 1934 2 Sheets-Sheet 1

EVELYN G. LEVKOFF.
INVENTOR

BY Ely & Pattison
ATTORNEYS

WITNESS:
G. Napton Lusby.

June 25, 1935. E. G. LEVKOFF Re. 19,625

COLLAPSIBLE EGG CARTON

Original Filed Sept. 22, 1934 2 Sheets-Sheet 2

EVELYN G. LEVKOFF.
INVENTOR

BY Ely & Pattison
ATTORNEYS

WITNESS:

Reissued June 25, 1935

Re. 19,625

UNITED STATES PATENT OFFICE 19,625

COLLAPSIBLE EGG CARTON

Evelyn G. Levkoff, Brooklyn, N. Y.

Original No. 1,990,336, dated February 5, 1935, Serial No. 745,014, September 22, 1934. Application for reissue March 19, 1935, Serial No. 11,899

7 Claims. (Cl. 229—29)

This invention relates to improvements in egg cartons and more particularly to a collapsible cellular type egg carton.

One of the main features of the invention is to provide a cellular egg carton in which the carton body is normally in a flat collapsed position, but which may be opened to receive the eggs to be packed therein without first effecting interlocking of the partition walls which is necessary for the setting up of the usual type of folding egg carton.

Another feature of the invention resides in a collapsible egg carton which may be quickly set up for use without the aid of a set up machine, thus eliminating the expense to small egg dealers of the purchase of such machines.

A further feature of the invention is the provision of a collapsible cardboard egg carton in which the body is constructed with a two section bottom wall, a double wall central longitudinal partition folded inwardly from the bottom wall, upstanding side walls, and a top wall or bridge piece connecting the tops of the side walls and from which the cross partitions are cut and bent, the double walls forming the central longitudinal partition being fixedly secured together to restrict the outward spreading of the bottom wall sections, while the top wall or bridge piece restricts outward spreading of the side walls, all of said walls being foldable flat and substantially parallel to the central longitudinal partition when the carton is in a collapsed position and which enables the setting up of the carton by the manual outward movement of the opposed side walls.

With these and other objects in view, the invention resides in the novel construction, combination and arrangement of parts, the essential features of which are hereinafter fully described, are particularly pointed out in the appended claims, and are illustrated in the accompanying drawings, in which:

Figure 1:
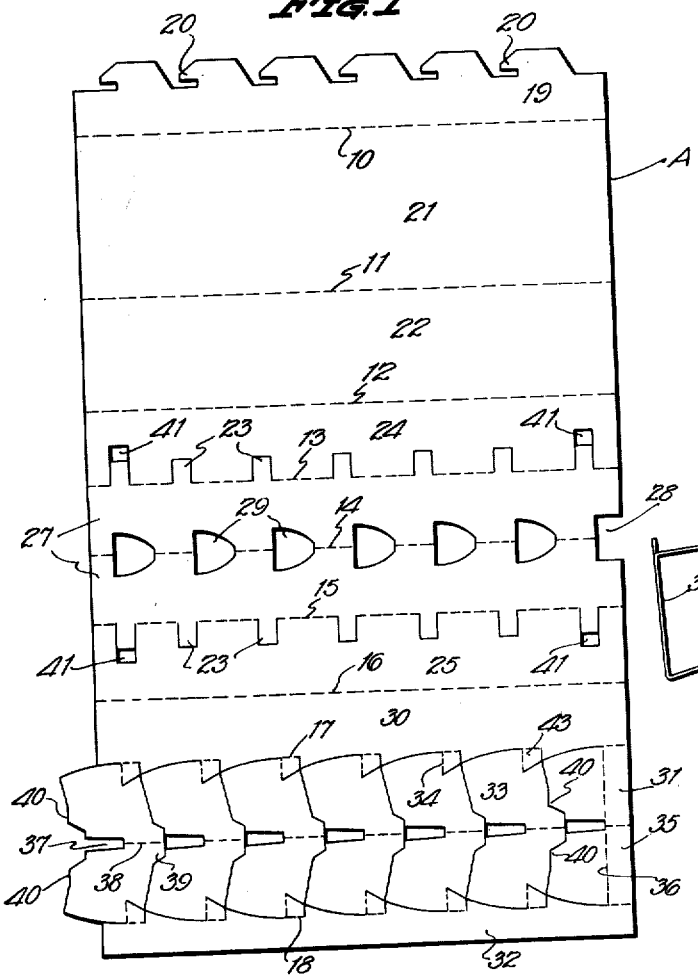
Figure 1 is a plan view of the blank from which the invention is constructed.

Referring to the drawings by reference characters, the letter A designates the blank of material from which my improved collapsible egg carton is constructed. The material A is preferably stiff cardboard of the type customarily used in the construction of egg boxes and the blank shown in Figure 1 is of substantially rectangular configuration. The blank A is scored transversely from top to bottom on the lines 10, 11, 12, 13, 14, 15, 16, 17, and 18. The material beyond the score line 10 constitutes a cover lock flap 19, the free edge of which is provided with locking tongues 20. The material between the score lines 10 and 11 constitutes a cover 21, while the score lines 11 and 12 divide the blank into a rear wall 22. The score lines 13 and 14 are broken scores and connect with feet 23 which are cut from the material forming the bottom wall sections 24 and 25. The bottom wall section 24 is disposed between the score lines 12 and 13 whereas the bottom section 25 is disposed between the broken score line 15 and the continuous score line 16. The material between the score line 14 and the broken score lines 13 and 15 provides a pair of longitudinal partition walls 27. The longitudinal partition walls 27 are provided with a series of spaced slots or cut outs 29 which extend equidistantly on opposite sides of the broken score line 14 to provide notches 28 in the top of the central longitudinal partition when the box is set up for use as will be hereinafter explained.

The un-notched portions of the longitudinal partition formed by folding the partition walls flat against each other provide spaced projections along the top of the longitudinal partition which are adapted to enter passages preferably in the form of slots in the transverse partitions about to be described during setting up or collapsing of the carton.

The material between the score line 16 and the broken score line 17 constitutes a front wall 30 while the material between the broken score lines 17 and 18 constituting a top wall 31, while the bottom edge of the blank below the broken score 18 provides an attaching flap 32.

Cut from the top wall 31 is a plurality of transverse partitions 33, all of the partitions 33 excepting the one at the right end of the blank being pivotally connected to the front wall 30 and attaching flap 32 on the dotted lines 34, while the right end partition flap is connected to a bridge piece 35 and is adapted to be swung inwardly upon the fold line 36. The transverse partitions 33 are notched inwardly at their midportions from their inner sides to provide notches or passageways 37 which are preferably shown as slots, and each transverse partition is foldable centrally and transversely upon its fold line 38 which extends from the inner end of its passageway 37 to the top or head end 39 thereof. The unnotched midportions of the transverse partitions are in transverse alinement with the respective slots or cut outs 29 and are of a width equal to or less than the width of the slots or cut outs to be freely received therein during the setting up of the carton. The two end transverse partitions are cut to provide projecting tongues 40 for reception in the slots 41 formed in the bottom wall sections 24 and 25.

Figure 2:
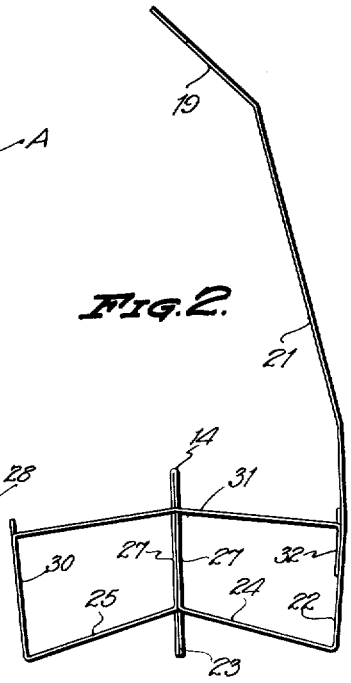
Figure 2 is an end elevational view of the collapsible egg carton set up for use.
Figure 6:
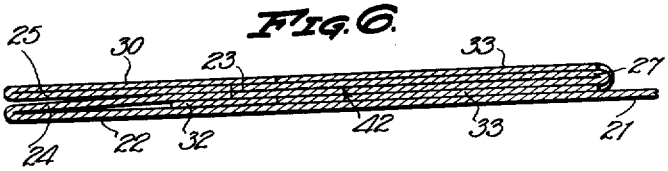
Figure 6 is an enlarged transverse sectional view on the line 6—6 of Figure 5.
Figure 7:
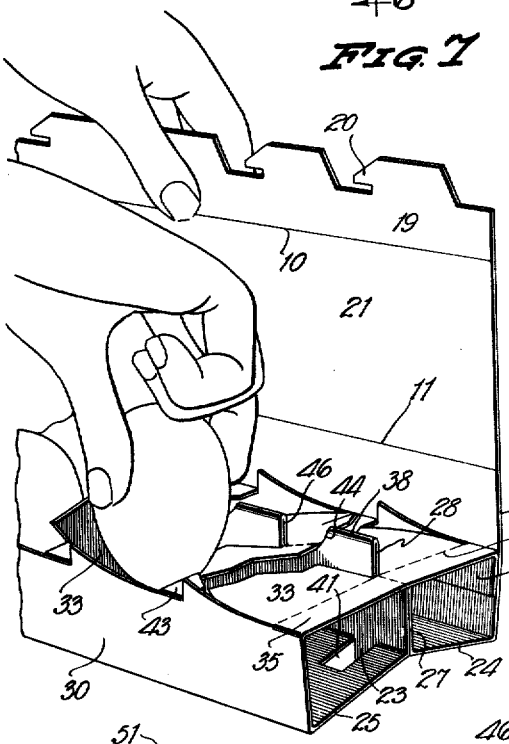
Figure 7 is a perspective view of one end of the egg carton in set up position and illustrating the manner in which the eggs are inserted therein.
Figure 9:
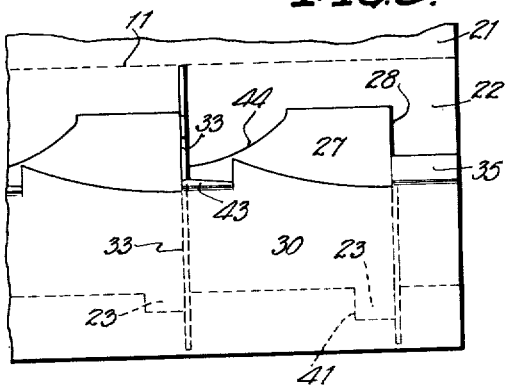
Figure 9 is a fragmentary front elevational view with the cover in open position.
Figure 10:
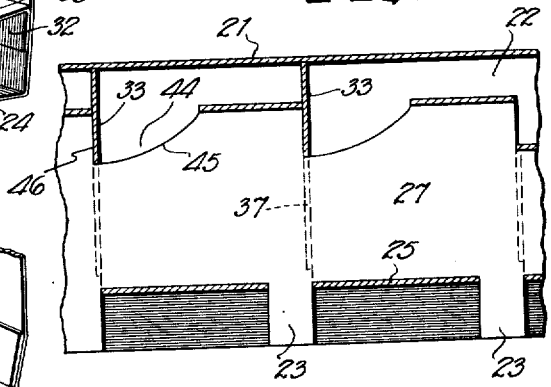
Figure 10 is a detail vertical longitudinal sectional view on the line 10—10 of Figure 8.

The carton is initially set up to assume the position shown in Figure 2 of the drawings, whereupon the longitudinal partition walls 27 are folded flat against each other on the fold line 14, and these two walls are fixedly secured together by an adhesive 42 shown in Figure 6 to prevent outward spreading of the walls. Although an adhesive has been shown and described, it is understood that the two walls 27 of the central longitudinal partition may be fixedly secured together by staples or the like. After forming the central longitudinal partition, the bottom wall sections 24 and 25 are bent outwardly, after which the front and rear walls 30 and 22 are bent upwardly and the top section 31 is brought over the longitudinal partition and secured to the rear wall by means of the attaching flap 32, which may be stitched or adhesively secured to the said rear wall. Thus it will be seen that by folding and securing the various walls in the manner described that the body of the box will assume the position shown in Figure 2 of the drawings, whereupon the bottom wall sections 24 and 25 extend upwardly and inwardly into meeting engagement from the rear and front walls respectively and the front and rear walls extend upwardly and outwardly at an angle. It might here be mentioned that the rear wall is of greater height than the front wall and has the cover 21 hingedly connected thereto, whereby the cover may be swung over the box body and secured closed by engagement of the hooks 20 with the portions 43 which join the transverse partition walls with the front and rear walls. When the box is initially set up as shown in Figure 2, the legs 23 extend downwardly from the meeting edges of the bottom wall sections and provide a support for the central portion of the bottom wall. By folding the partition walls 27 flat against each other and fixedly securing the same together, the cut outs 29 provide notches 44 in the top of the central longitudinal partition, which notches include a curved wall 45 and a vertical shoulder 46 and the open mouths of the notches are of a width at least equal to the length of the folded midportions of the transverse partitions and are disposed in alinement with the folded midportions of respective transverse partitions 33. However, the notch 26 hereinbefore mentioned accommodates the bridge piece 35 as best seen in Figure 7 of the drawings.

Figure 3:
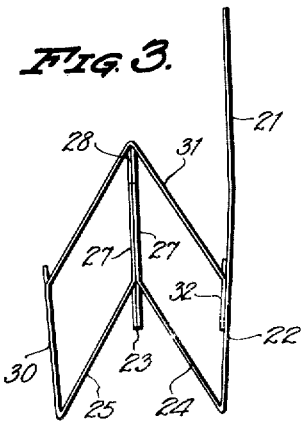
Figure 3 is a view similar to Figure 2 but showing the egg carton in a partially collapsed position.
Figure 4:
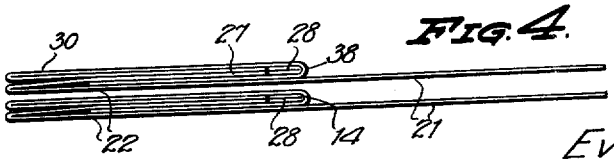
Figure 4 is an end elevation of two egg cartons in fully collapsed position and illustrating the manner in which a supply of collapsed cartons may be stacked one upon the other.
Figure 5:
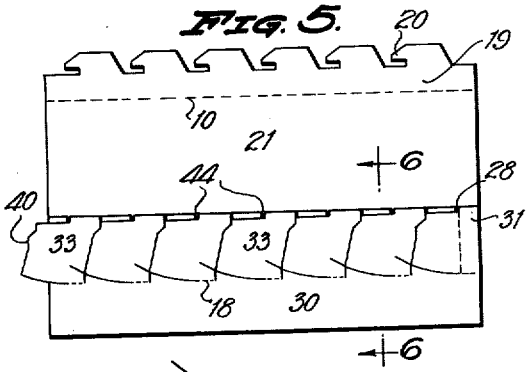
Figure 5 is a front elevational view with the body of the carton in a collapsed position.
Figure 8:
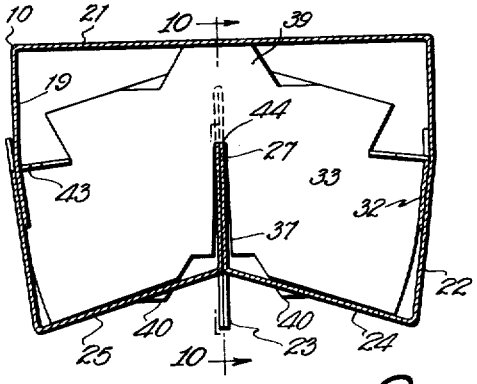
Figure 8 is a vertical transverse sectional view through the egg carton with the cross partitions folded down within the box body.

From the description of the set up of the box up to this point, no mention has been made as to the infolding of the transverse partitions 33, and they are assumed to be in the position shown in Figure 2 where they bridge the front and rear walls of the carton body and seat in the notches 44. From this position, the body of the carton may be folded flat as shown in Figures 4 and 6, and in Figure 3 a view illustrates the initial movement of the carton body to a collapsed position. To collapse the body of the carton, it is only necessary to press the front and rear walls toward each other, whereupon the top 31 and bottom wall sections 24 and 25 will move to a position substantially parallel to the fixed walls 27 of the longitudinal partition. When in this position, the cartons may be compactly stacked one upon the other as shown in Figure 4 so as to require but little room in the storing and packing of the cartons. To open the box body for use, the reverse action takes place, that is, the front and rear walls are moved away from each other, the top wall 31 tending to limit the spreading of the top of the front and rear walls, while the fixedly attached partition walls 27 limit outward spreading of the inclined bottom wall sections. Upon opening of the box body, the midportions of the transverse partitions freely enter the notches 44 while the projections 29′ unnotched portions of the longitudinal partition enter the slots or passageways 37 thereof, after which the transverse partitions may be swung to vertical position. Thus it will be seen that the box body is set up for use as shown in Figure 2 and may receive the eggs to be packed by merely dropping them into the respective compartments as illustrated in Figure 7. As an egg is placed or dropped into one of the cells, the cross partition 33 will drop to a substantially vertical position and during its movement, the closed end of the passageway 37 in the transverse partition will ride upon the curved edge 45 of the notch 44 and will strike and abut the shoulder 46 as best seen in Figure 7. As the two end cross partitions are swung to vertical position, the projecting tongues 40 will seat in the notches 41 in the bottom wall sections 24 and 25 as illustrated in Figure 8. The bottom and side edges of the remainder of the transverse partitions merely abut the sides and bottom walls of the box body.

When the transverse partitions 33 are in vertical position, the head ends 39 extend above the longitudinal partition and provide a rest for the cover 21. However, the central partition may be extended above the tops of the transverse partitions or to a plane even therewith as shown in the modification in Figure 11 if desired.

It is appreciated that various types of one piece egg boxes have been constructed, but to set them up has required the use of set up machines. By reason of the fact that the two walls forming the central longitudinal partition are fixedly secured together, any collapsing of the outwardly diverging bottom wall sections is prevented during the setting up of the box and permits of the ready collapsing or setting up of the carton body. As before stated, when the carton body is set up, the transverse partitions automatically fall into the notches 44 to be moved to their vertical positions upon the placing of the eggs in the respective cell compartments.

Figure 11:
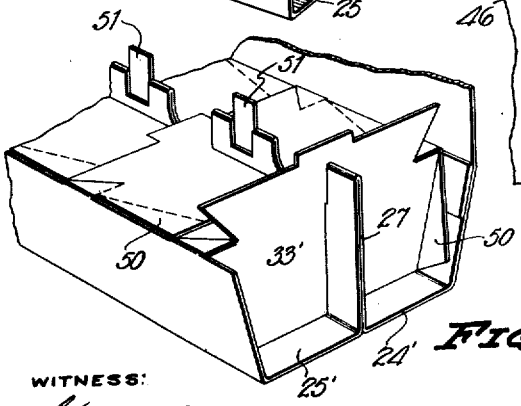
Figure 11 is a fragmentary perspective view of a modified form of my invention.

In Figure 11 of the drawings, I have illustrated a slightly modified form wherein the bottom wall sections 24' and 25' are flat rather than inclined. Also in this form, opposite sides of the transverse partitions 33' are provided with triangular shaped flaps 50 which fold at right angles to the transverse partition walls and frictionally engage the front and rear walls of the carton body. This construction eliminates the interlocking of the cross partitions with the walls of the box body. Also in this form, upstanding extensions 51 are provided in the top of the central longitudinal partition to support the cover of the box when in closed position. The extension portions 51 are formed by cutting one of the walls of the central longitudinal partition in a manner similar to that used for the formation of the feet 23. These extension portions 51 may terminate on a plane even with the tops of the transverse partition walls when the said walls are in vertical position or may extend thereabove.

While I have shown and described what I deem to be the most practical embodiment of my invention, I wish it to be understood that such changes and modifications may be resorted to as come within the scope of the appended claims.

Having thus described the invention, what I claim as new and desire to secure by Letters Patent of the United States, is:—

1. A collapsible egg carton comprising front and rear walls, a bottom wall hinged to said front and rear walls and having a central longitudinal fold line, a longitudinal partition hinged to said bottom wall along its line of fold, transverse partitions hinged to said front and rear walls adjacent the top thereof, a fold line extending transversely of said transverse partitions along the midportions thereof to enable portions of said transverse partitions which are disposed on opposite sides of said fold lines to fold flat against the respective opposite sides of said central longitudinal partition when the box is in collapsed position, said transverse partitions each having a slot in its inner side edge in alinement with its central fold line, and notches provided in the top of said longitudinal partition of a width at least equal to the length of the fold lines of said transverse partitions to freely receive the midportions of the transverse partitions when the front and rear walls are spread apart to set up position whereby said transverse partitions may be swung to a substantially vertical position crosswise of said longitudinal partition.

2. A collapsible egg carton comprising front and rear walls, a bottom wall formed of two upwardly and inwardly inclined sections, a double wall longitudinal partition formed integral with and folded inwardly of said bottom wall sections, the walls of said double wall longitudinal partition being fixedly secured together to prevent separation thereof, transverse partitions hinged to said front and rear walls adjacent the top thereof, a fold line extending transversely of said transverse partitions along the mid portions thereof to enable portions of said transverse partitions which are disposed on opposite sides of said fold lines to fold flat against the respective opposite sides of said central, longitudinal partition when the box is in collapsed position, said transverse partitions each having a slot extending inwardly from its inner side edge in alinement with its central fold line, and notches provided in the top of said longitudinal partition of a width at least equal to the length of the fold lines of said transverse partitions to freely receive the mid portions of the transverse partitions when the front and rear walls are spread apart to set up position whereby said transverse partitions may be swung to a substantially vertical position crosswise of said longitudinal partition.

3. A collapsible egg carton comprising front and rear walls, a bottom wall formed of two upwardly and inwardly inclined sections, a double wall longitudinal partition formed integral with and folded inwardly of said bottom wall sections, the walls of said double wall longitudinal partition being fixedly secured together to prevent separation thereof, transverse partitions hinged to said front and rear walls adjacent the top thereof, a fold line extending transversely of said transverse partitions along the mid portions thereof to enable portions of said transverse partitions which are disposed on opposite sides of said fold lines to fold flat against the respective opposite sides of said central longitudinal partition when the box is in collapsed position, each of said transverse partitions having a slot extending inwardly from its free inner end in alinement with its central fold line, and notches provided in the top of said longitudinal partition of a width at least equal to the length of the fold lines of said transverse partitions to freely receive the midportions of the transverse partitions when the front and rear walls are spread apart to set up position whereby said transverse partitions may be swung to a substantially vertical position crosswise of said longitudinal partition, and downwardly extending feet cut from the bottom wall sections adjacent opposite sides of the central longitudinal partition and being coextensive with the walls thereof to provide a support for the central portion of said bottom wall when the carton is in set up position.

4. A collapsible egg carton comprising front and rear walls, a bottom wall formed of two upwardly and inwardly inclined sections, a double wall longitudinal partition formed integral with and folded inwardly of said bottom wall sections, the walls of said double wall longitudinal partition being fixedly secured together to prevent separation thereof, transverse partitions hinged to said front and rear walls adjacent the top thereof, a fold line extending transversely of said transverse partitions along the midportions thereof to enable portions of said transverse partitions which are disposed on opposite sides of said fold lines to fold flat against the respective opposite sides of said central longitudinal partition when the box is in collapsed position, each of said transverse partitions having a slot extending inwardly from its free inner end in alinement with its central fold line, notches provided in the top of said longitudinal partition of a width at least equal to the length of the fold lines of said transverse partitions to freely receive the midportions of the transverse partitions when the front and rear walls are spread apart to set up position whereby said transverse partitions may be swung to a substantially vertical position crosswise of said longitudinal partition, said bottom wall sections having spaced slots therein respectively disposed on opposite sides of the longitudinal partition, and pairs of tongues on the free inner ends of said transverse partitions for reception in said slots when said transverse partitions are swung to a substantially vertical position.

5. A collapsible egg carton comprising front and rear walls, a bottom wall hinged to said front wall and rear wall and having a central longitudinal fold line, a double wall longitudinal partition hinged to said bottom wall along its line of fold, the walls of said double wall longitudinal partition being fixedly secured together, transverse partitions hinged to said front and rear walls adjacent the top thereof, all adapted to fold into substantially parallel relation with respect to one another when in collapsed position, said transverse partitions each having a slot in its inner side edge at the midportion thereof, and notches extending inwardly from the top edge of said longitudinal partition, the entrances of which are in transverse alinement with and of a width at least equal to the length of the respective unnotched midportions of said transverse partitions to permit of the free vertical sliding movement of the unnotched midportions through the entrances of the notches and inwardly thereof without flexing of said transverse partitions or the longitudinal partition during collapsing and setting up of the carton, said transverse partitions adapted to be swung to a substantially vertical position crosswise of said longitudinal partition when the carton is set up for use.

6. A carton comprising a single blank of cardboard of substantially rectangular configuration in plan scored to divide the same into a cover, a rear wall, a bottom wall section, a longitudinal partition wall section, a second bottom wall section, a front wall, a top wall, and an attaching flap for attachment to the rear wall when the blank is folded and secured in set up position, a central longitudinal fold line dividing the longitudinal partition section into identical wall sections for folding one against the other and adapted to be secured together to provide a double wall longitudinal partition, said longitudinal partition section having a central row of slots therein which extend at equal distances on opposite sides of the central longitudinal fold line and which form notches in the top of the longitudinal partition, transverse partitions cut from said top wall, each of said transverse partitions having a slot in its inner side edge at the midportion thereof, the unnotched midportions of the transverse partitions being in transverse alinement with and of a width equal to or less than the width of respective slots in said longitudinal partition section, whereby the unnotched midportions of said transverse partitions may freely enter the notches formed by said slots when the blank is folded into carton forming position and the slots in said transverse par'itions may receive the folded longitudinal partition section.

7. A carton comprising a single blank of cardboard of substantially rectangular configuration in plan scored to divide the same into a cover, a rear wall, a bottom wall section, a longitudinal partition wall section, a second bottom wall section, a front wall, a top wall, and an attaching flap for attachment to the rear wall when the blank is folded and secured in set up position, a central longitudinal fold line dividing the longitudinal partition section into identical wall sections for folding one against the other and adapted to be secured together to provide a double wall longitudinal partition, spaced legs cut from the bottom wall sections and integral with the longitudinal wall sections to cushion the bottom of the carton when the blank is folded, said longitudinal partition section having a central row of slots therein which extend at equal distances on opposite sides of the central longitudinal partition, transverse partitions cut from said top wall, each of said transverse partitions having a slot in its inner side edge at the midportion thereof, the unnotched midportions of the transverse partitions being in transverse alinement with and of a width equal to or less than the width of respective slots in said longitudinal partition section, whereby the unnotched midportions of said transverse partitions may freely enter the notches formed by said slots when the blank is folded into carton forming position and the slots in said transverse partitions may receive the folded longitudinal partition section.

EVELYN G. LEVKOFF.